United States Patent [19]

Gibby et al.

[11] 4,257,847

[45] Mar. 24, 1981

[54] NUCLEAR BREEDER REACTOR FUEL ELEMENT WITH AXIAL TANDEM STACKING AND GETTER

[75] Inventors: Ronald L. Gibby, Richland; Leo A. Lawrence, Kennewick; Robert E. Woodley; Charles N. Wilson, both of Richland; Edward T. Weber, Kennewick, all of Wash.; Carl E. Johnson, Elk Grove, Ill.

[73] Assignee: The United States of America as represented by the United States Department of Energy, Washington, D.C.

[21] Appl. No.: 949,340

[22] Filed: Oct. 6, 1978

[51] Int. Cl.³ .............................................. G21C 3/02
[52] U.S. Cl. .................................... 176/68; 176/40; 176/91 R
[58] Field of Search ...................... 176/40, 68, 91 R

[56] References Cited

U.S. PATENT DOCUMENTS

| 3,141,830 | 7/1964 | Klepfer et al. | |
| 3,205,139 | 9/1965 | Stewart et al. | 176/68 X |
| 3,238,108 | 3/1966 | Deddens et al. | 176/68 |
| 3,243,613 | 3/1966 | Grover | 176/39 |
| 3,354,044 | 11/1967 | Robertson | 176/68 |
| 3,429,774 | 2/1969 | Gurinsky et al. | 176/40 |
| 3,629,063 | 12/1971 | Houston | 176/68 X |
| 3,742,367 | 6/1973 | Grossman . | |
| 3,804,709 | 4/1974 | Penrose et al. | |
| 3,898,125 | 8/1975 | Grossman et al. | |
| 3,899,392 | 8/1975 | Grossman et al. | |
| 4,124,659 | 11/1978 | della Porta et al. | 176/68 X |

FOREIGN PATENT DOCUMENTS

| 1921203 | 4/1969 | Fed. Rep. of Germany . |
| 1131480 | 10/1968 | United Kingdom . |
| 1248184 | 9/1971 | United Kingdom . |
| 1507487 | 4/1978 | United Kingdom . |

*Primary Examiner*—Peter A. Nelson
*Attorney, Agent, or Firm*—D. C. Abeles; Z. L. Dermer

[57] ABSTRACT

A breeder reactor fuel element having a tandem arrangement of fissile and fertile fuel with a getter for fission product cesium disposed between the fissile and fertile sections. The getter is effective at reactor operating temperatures to isolate the cesium generated by the fissile material from reacting with the fertile fuel section.

7 Claims, 4 Drawing Figures

NUCLEAR BREEDER REACTOR FUEL ELEMENT WITH AXIAL TANDEM STACKING AND GETTER

BACKGROUND OF THE INVENTION

The invention described herein was made in the course of or under a contract with U.S. Department of Energy and pertains generally to breeder reactor fuel elements and more particularly to breeder reactor fuel elements incorporating fission product getters.

A number of fast breeder reactors employ both radial and axial blankets of fertile material, which when subject to fast neutrons will undergo the breeding reaction. Generally, the center of the core comprises mostly fissile material which sustains the fast neutron reaction. In one design currently proposed a number of the fuel pins within the core include a fertile column of fuel arranged in tandem above and below a column of fissile fuel material; with the tandem arrangement being enclosed within a single element.

Cesium is one of the most abundant fission products created during irradiation of $UO_2$ and $PuO_2$ in fast breeder reactor fuel elements. With a low melting temperature and a high vapor pressure at typical oxide fuel operating temperatures in liquid metal fast breeder reactors, cesium relocates readily both radially and axially within a fuel pin. Non-destructive examinations of tandemly arranged fissile and fertile fuel columns have shown that the cesium often concentrates at the end of the fuel columns where the temperature is lower.

It has been observed that cesium concentrations occur due to the preferential reaction of cesium with $UO_2$ insulator pellets commonly used at the ends of the fissile column, forming low density cesium uranate compounds. Analysis of a defective fuel pin which had undergone irradiation indicated that a cladding breach resulted from localized stresses developed in the cladding due to volume changes in the insulator pellet as a result of the cesium-$UO_2$ compound formation. Since cesium formation and relocation cannot be prevented, detrimental reaction of cesium with the $UO_2$ insulator and/or $UO_2$ blanket pellets has the potential of affecting reactor performance, with possible economic impact on the breeder fuel cycle.

Accordingly, a new fast breeder reactor fuel pin design is desired that would not be subject to localized stresses imparted on the fuel cladding as a result of reactions with cesium.

SUMMARY OF THE INVENTION

Briefly, this invention provides an improved breeder reactor fuel element having a column of fertile material arranged in tandem with a column of fissile material with a cesium getter disposed between the fissile and fertile sections. The getter is substantially effective at reactor operating temperatures to isolate the cesium generated by the fissile material from reacting with the fertile column.

Desirably, in the preferred embodiment, the gettering material comprises a low density pellet of either titanium oxide or niobium oxide.

BRIEF DESCRIPTION OF THE DRAWINGS

For a better understanding of the invention reference may be had to the preferred embodiment, exemplary of the invention, shown in the accompanying drawing, in which.

DESCRIPTION OF THE PREFERRED EMBODIMENT

In accordance with the preferred arrangement of this invention a low density (sintered) niobium or titanium oxide pellet is disposed as a cesium getter on either side of a fissile column of fuel in a breeder reactor fuel pin having a fertile fuel column arranged in tandem above and/or below the fissile material. The getter pellets provide the necessary thermal insulation required at the ends of the fissile fuel column and, in addition, provide a means to retain cesium in a controlled manner in the fissile fuel region, thereby preventing less predictable reactions of cesium with the fertile material, such as the $UO_2$ pellets in the breeder blanket.

Results from an experiment in which uranium dioxide and titanium dioxide pellets were sealed in a stainless steel capsule containing cesium have revealed that cesium reacts preferentially with titanium dioxide in an environment simulating breeder reactor operating conditions. Additional results have shown that niobium pentoxide is also a favorable cesium getter for this purpose.

Figure 2:
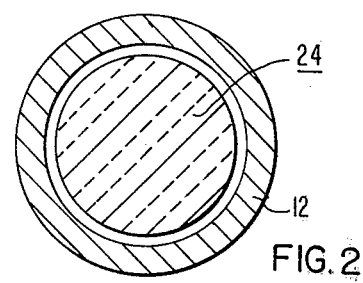
FIG. 2 is a cross-sectional view of the fuel element of FIG. 1 taken along the lines A—A thereof.
Figure 3:
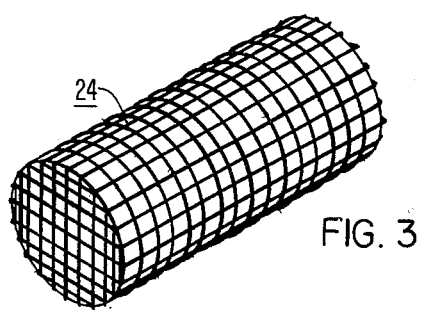
FIG. 3 is a perspective view of the cesium trap employed in the fuel element of FIG. 1.
Figure 4:
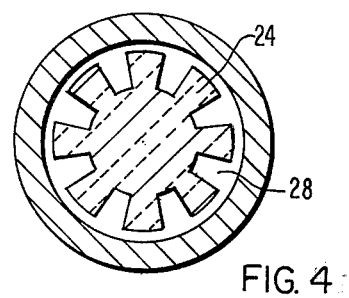
FIG. 4 is a top view of a second alternative embodiment to the cesium trap illustrated in FIG. 3.

Volume expansion accompanies formation of cesium titanates and cesium niobates from titanium oxide or niobium oxide; therefore, cesium trap pellets fabricated from these materials should be designed so that the volume increase does not result in any mechanical interactions with the cladding. This can be accomplished by either using a low density sintered pellet, where pore volume accommodates the volume change from reaction product formation, by utilizing a reduced diameter pellet, or by machining slots or gaps into the basic cylindrical configuration of a dense pellet to accommodate the volume expansion. The getter pellet design 24 shown in FIGS. 1 and 2 utilizes a reduced diameter to accommodate expansion while the design illustrated in FIG. 3 illustrates void slots 28 employed for this purpose. For example, 0.200 in. and 0.160 in. are representative dimensions which can be employed in the reduced diameter design, respectively for the inside diameter of the cladding and the outside diameter of the getter pellet.

Figure 1:
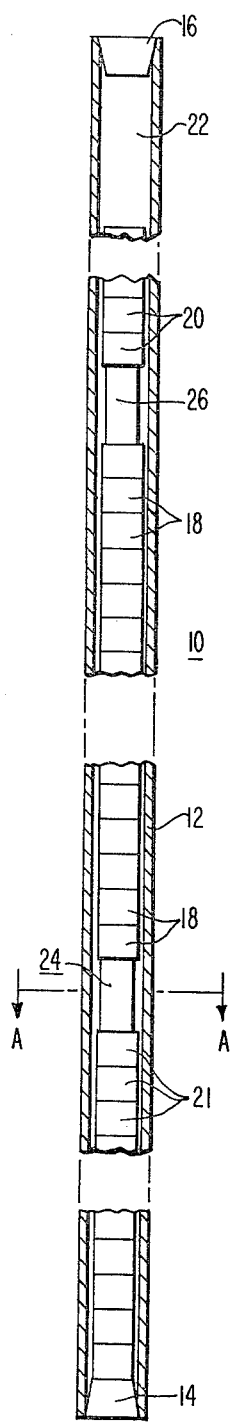
FIG. 1 shows a longitudinal cross-sectional schematic view of the improved nuclear fuel element of this invention.

FIG. 1 illustrates an improved fuel pin for a nuclear breeder reactor, constructed in accordance with the preferred arrangement of this invention. The fuel pin 10 includes a tubular cladding 12 sealed at either end by a pair of end plugs 14 and 16. A stacked arrangement of fissile fuel pellets 18 is sandwiched between either titanium dioxide or niobium oxide insulator pellets 24 and 26. A similar arrangement of fertile pellets 20 and 21 is stacked in tandem above and/or below the insulator pellets 24 and 26. Commonly, a void region 22 is provided in the upper portion of the fuel pin.

In the arrangement illustrated the cesium traps 24 and 26 are designed to retain the mobile fission product cesium in a controlled region to prevent localized reactions with the uranium dioxide blanket pellets, which could result in localized cladding stresses and, in the extreme case, breach of the cladding. In the embodiment illustrated in FIG. 3 a getter pellet is shown constructed within a supporting wire cage to prevent disintegration of the pellet as a result of its reaction with cesium, which otherwise could affect the support given to the fertile columns. Other means of spacing the fertile and fissile columns can also be used for this purpose to prevent shifting of the fuel during reactor operation.

It should be noted, that in breeder reactor designs the fissile material is usually depleted of oxygen, and therefore, does not react with cesium in the same manner as the fertile material to produce localized cladding stresses. The fertile section of uranium dioxide cannot practically be so depleted.

It should be further appreciated that the aforegoing concept works equally well with a fissile plutonium-thorium fuel cycle or any other cycle which generates cesium and is employed in combination with a fertile uranium dioxide blanket.

Accordingly, an improved breeder reactor fuel element is provided which reduces localized stresses on the cladding walls due to the cesium fission product reaction within the fertile column.

We claim:

1. An improved breeder reactor fuel element including a tubular cladding hermetically sealed at each end by an end plug, one interior portion of the cladding defining a fuel plenum filled with a column of fissile material, and a column of fertile material arranged axially in tandem with the fissile column within the cladding, wherein the improvement comprises a cesium getter disposed between the fissile and fertile columns which is substantially effective at reactor operating temperatures to isolate the cesium generated by the fissile material from reacting with the fertile column.

2. The improved fuel element of claim 1 wherein the cesium getter is made of a substance selected from the group consisting of $Nb_2O_5$ and $TiO_2$.

3. The improved fuel element of claim 1 wherein the cesium getter is disposed on either side of the fissile column.

4. The improved fuel element of claim 1 wherein the fissile material comprises a mixture of $PuO_2$ and $UO_2$ and the fertile material comprises $UO_2$.

5. The improved fuel element of claim 1 wherein the getter is formed to permit volume expansion during reactor operation.

6. The improved fuel element of claim 5 wherein the getter pellet is formed with void cavities to permit volume expansion.

7. The improved fuel element of claim 1 wherein the getter includes a rigid support for maintaining the spacing between the fissile and fertile fuel columns.

* * * * *